3,743,496
TREATMENT OF ANIMAL AND FOWL LITTER
AND FECES
William Seltzer, Vineland, N.J., assignor to
Vineland Laboratories, Inc.
No Drawing. Continuation-in-part of abandoned application Ser. No. 755,785, Aug. 28, 1968. This application Dec. 13, 1971, Ser. No. 207,543
Int. Cl. C05f 3/00
U.S. Cl. 71—21          7 Claims

ABSTRACT OF THE DISCLOSURE

The invention provides a method of treating animal and fowl litter, feces and guano with formaldehyde or formaldehyde-yielding compounds in the presence of poultry or livestock to suppress the bacterial content and the formation of ammonia in the feces and litter resulting in a product with increased and long-acting nitrogen for use as a fertilizer. The formaldehyde, which is preferably used in its solid form, paraformaldehyde, can be mixed with additives such as turpentine, pine oil, thymol, camphor oil, Patchouli oil, crystal violet, gentian violet, methylene blue, and a combination of methyl orange and bromthymol blue to obtain special effects, such as preventing natural wildlife or other animals and fowl from being attracted to and consuming the formaldehyde, and masking the odor of the formaldehyde.

---

This application is a continuation-in-part of my prior application Ser. No. 755,785 filed Aug. 28, 1968, and now abandoned.

The present invention is directed to the method of treating domesticated and wild animals and fowl litter, feces and guano in the presence of poultry or livestock with formaldehyde or formaldehyde-yielding compounds to suppress the bacterial content, suppress the formation of ammonia, neutralize the ammonia formed and conserve or increase the total nitrogen in the feces and litter thereby making a good fertilizer and, more specifically, to the treatment of litter, feces and guano with paraformaldehyde having additives mixed therein for camouflaging and masking the odor of the paraformaldehyde to prevent livestock or fowl from being attracted to and ingesting it.

Up until the present invention, attempts have been made in the art to eliminate ammonia and other odors by use of ventilating fans, which often chilled animal housing below safe limits or dried litter so much that irritating dust resulted; by use of certain acid salts, such as monocalcium phosphate, which required frequent application and high labor costs and which resulted in increasing mold growth in the litter and only temporary lowering of irritating ammonia fumes; and by the use of liquid which, first, required removal of the animals from the area to be sprayed and, second, never realized the need for treating the feces in the litter in a quantitative and prolonged manner. Thus, with liquid sprays, only a limited disinfection resulted, ammonia fumes soon arose again, the animals so housed lost weight, suffered respiratory diseases, laying hens reduced their egg production, and the litter lost nitrogen and fertilizer value. The art has been seeking means for treating feces and litter, especially in the presence of livestock or fowl without adversely affecting the fertilizing value of the treated litter and feces.

It has now been discovered that application of about 0.01% to about 7%, and preferably about 0.05% to about 3% and for best results from about 0.5% to about 3% by weight of paraformaldehyde or an equivalent amount of a formaldehyde-yielding compound such as methenamine, methenamine compounds, formaldehyde hydrosulfite, formaldehyde bisulfite and formaldehyde sodium sulfoxylate to feces and litter based on the weight of feces will not adversely affect livestock or fowl, will suppress the bacteria content, suppress and neutralize the formation of ammonia, conserve or increase the nitrogen value and harden the proteinaceous material in the feces and litter resulting in a slow releasing nitrogen fertilizer. Further, it has also been found that a single application will last for approximately four weeks and thereby reduce the time and cost for handling and treating the feces and litter.

While it has been discovered that the best results are obtained with paraformaldehyde or a formaldehyde-yielding compound, it should be understood that gaseous and liquid formaldehyde can also be used, although they are less desirable since the treatment must be repeated more often than with the paraformaldehyde and in the case of a formaldehyde solution unwanted water is present.

The paraformaldehyde, which is available in flake form, is applied by spreading it over the areas to be treated. The quantity of the paraformaldehyde to be used will depend on the amount of feces present or expected to accumulate. For purposes of estimating the amount of feces present or expected, it is to be noted that in the case of fowl, a single chicken eating a pound of feed will produce approximately one pound of feces. Therefore, a farmer knowing how much feed has been fed to the chickens can readily determine the amount of paraformaldehyde required.

As is known, litter includes a carrier such as straw, hay, peanut shells, oat hulls, wood shavings, sawdust, rice hulls, bagasse, or other fibrous absorbent material and that because of the animal or fowl excretion is usually wet. However, because the paraformaldehyde is only soluble in water, it may be applied directly on the litter whether wet or dry. This saves much time and effort by the farmer. The toxicity of paraformaldehyde in the above-mentioned range on fowl and livestock is surprisingly low. When paraformaldehyde was fed to chickens and mice in comparatively large proportions as part of their feed for several weeks, unexpectedly, there was no adverse effect on the mice and only two chickens out of 38 died. To prevent the fowl from eating the paraformaldehyde, it has been discovered that additives can be mixed with the paraformaldehyde to repel the chickens without interfering with the beneficial effects of the paraformaldehyde upon the litter and feces. Examples of additives which will camouflage the paraformaldehyde include crystal violet, gentian violet, methylene blue, a combination of methyl orange and bromthymol blue, which will turn purple in an alkaline medium such as ammonia, and combinations thereof. Also, turpentine, pine oil, thymol, camphor oil, Patchouli oil, and combinations thereof can be mixed with the paraformaldehyde to mask the paraformaldehyde odor as well as to make it repugnant to the animal or fowl.

Further, it was noted these materials suppress the decomposition of the paraformaldehyde into formaldehyde gas, providing a longer period of time before another treatment is required. The amount of additives which can be mixed with the paraformaldehyde is about 0.02% to about 2% based on the weight of paraformaldehyde.

Immediately after the application of the paraformaldehyde on the feces and litter, there is a marked reduction in the ammonia odor in the area treated. Also, when an area having a concentration of over 50 p.p.m. ammonia occupied by laying hens was treated, surprisingly, egg production increased over what was formerly experienced with the same hens. It is believed that this increased egg production may be a result of the suppression of the formation of ammonia which is an irritant to the hens or a result induced by the suppression of pathogenic organisms present.

An additional advantage of the paraformaldehyde treatment is the beneficial effect on the fertilizer value of the feces in the treated litter. As explained above, the paraformaldehyde reacts with the proteinaceous material in the litter and feces to cause it to become less water soluble whereby the nitrogen content is released more slowly and over a longer period of time when used as a fertilizer. Also, the paraformaldehyde treatment conserves the nitrogen in the feces and litter, making it a very desirable fertilizer without increasing its cost.

The fact that the formaldehyde added to the feces creates a good fertilizer with a slow release of nitrogen is totally unexpected. The usual problems with the use of animal and fowl feces as fertilizer are twofold. If the animal and fowl feces are applied immediately, they are too strong and tend to "burn" the crops to which they are applied. On the other hand, if the feces are allowed to stand for a period of time before applying them as the fertilizer, they will lose most of their effectiveness since the nitrogen, which is their most important value as a fertilizer, will be lost in the form of ammonia gas. In contrast to this, the applicant has discovered that when the feces are treated with formaldehyde or a formaldehyde-yielding compound a fertilizer is formed which can be applied immediately since it will not "burn" the crops or, more importantly, it can be applied later since the nitrogen value of the feces will be maintained by the formaldehyde treatment. In addition, once the treated feces are applied to the crops, the release of nitrogen is at a slow controlled rate which greatly enhances the value of the feces as a fertilizer. This is a totally unexpected result. When formaldehyde or a formaldehyde-yielding compound is added to animal and fowl feces, it would be expected that they would combine to form methenamine since the gaseous odor released from animal and fowl feces is largely ammonia. However, it would likewise be expected that the treated feces would have no value as a fertilizer since feces are alkaline and it is a well known fact that methenamine has an extremely low hydrolysis constant in alkaline conditions and the hydrolysis constant is so low that methenamine is virtually worthless as a fertilizer in alkaline conditions. In contrast to this, the applicant's treated feces release nitrogen at a slow rate over an extended period of time and are thus excellent for use as fertilizers. The exact reason why the formaldehyde treated feces make a good fertilizer, as opposed to the fact that methenamine would make a poor fertilizer, is not known but may in part be due to the complexing of the proteinaceous material and in any case it has been discovered that the formaldehyde treated feces do make an excellent fertilizer which liberates nitrogen slowly over an extended period of time.

Because the paraformaldehyde suppresses the bacterial content of the treated material, there is a marked reduction in disease among livestock and fowl and less hazard in handling the treated material.

While the use of the paraformaldehyde and formaldehyde-yielding compounds has been described in connection with the treatment of litter and feces in the presence of livestock and fowl, it should be understood that such treatment can also be applied to feces in the absence of the livestock and fowl. More specifically, animal and fowl feces are sometimes accumulated in pits, dropping boards and lagoons. Also, guano, which is the feces of sea fowl, is collected for use as fertilizer. By treating these accumulated feces with paraformaldehyde or formaldehyde-yielding compounds, the total nitrogen in the feces is conserved or increased, the material is substantially sterile, odor free and will slowly release its total nitrogen making it an excellent fertilizer material. After the feces is treated, it is conveniently dried in conventional driers such as drum driers and shelf driers. The treated material is then ready to be used as a fertilizer without further treatment.

Further details of the present invention may be readily understood in connection with the description given in the following examples which have been selected for the purpose of illustration only and are not limitations upon the invention.

EXAMPLE 1

Sixty-four meat type breeder hens and seven meat type males were enclosed in a room 270 square feet in area. The hens were 29 weeks of age at the time of the first litter treatment and had been in egg production since 22 weeks of age. Ten pounds of paraformaldehyde flake was spread and mixed into the litter in the presence of the chickens. Moistened p Hydrion papers were used daily in the treated area to detect a change in atmospheric pH. After an interval of seven weeks from the first treatment, twenty additional pounds of paraformaldehyde was spread and mixed into the litter. None of the hens or males were adversely affected by the litter treatment, although it was noted that the chickens dusted themselves in the litter and were in constant contact with the litter. The pH of the atmosphere within the room was a maximum of 11 for five days previous to the litter treatment. Ammonia odor was very noticeable and was sufficient to be uncomfortable to birds and humans prior to litter treatment. Twenty-four hours after the first litter treatment, the ammonia odor was not detected by smell and the room atmosphere showed a pH of 7. Five days after the first treatment of the litter the atmosphere was neutral to pH paper and remained that way for an additional 24 days at which time a slow, steady increase in pH was noted for an additional nine days until the pH again registered a maximum of 11. Egg production averaged 37 per day during the week of litter treatment and gradually increased each following week until the atmospheric ammonia gas level again reached a maximum pH of 11, at which time egg production started to decrease. A period of three weeks was then allowed to lapse during which time the atmospheric pH remained a constant pH 11. After the second treatment of paraformaldehyde was mixed into the litter, an immediate drop in the atmospheric pH occurred. Egg production averaged 46 eggs per day after the first week of the treatment and over the next four weeks declined to an average of 42 eggs per day.

EXAMPLE 2

Example 1 is repeated except in place of the paraformaldehyde flake, formaldehyde hydrosulfite is used.

EXAMPLE 3

Example 1 is repeated except in place of the paraformaldehyde flake, formaldehyde sodium sulfoxylate is used.

EXAMPLE 4

Paraformaldehyde powder was mixed at 0.2%, 0.1% and 0.01% by weight per pound of feed and fed to three separate groups of three week old straight run meat type birds.

Group one received the 0.2% mixture, group two received the 0.1% mixture, group three received the 0.01% mixture and a fourth group acting as a control received untreated feed.

It was noted that all groups readily accepted the feed. The total weight at the conclusion of the experiment was as follows:

|  | Treatment level | Total group wt. |
| --- | --- | --- |
| (9 birds) group 1 | 0.2% | 32 lbs., 7 oz. |
| (9 birds) group 2 | 0.1% | 33 lbs., 0 oz. |
| (10 birds) group 3 | 0.01% | 35 lbs., 2 oz. |
| (10 birds) group 4 | Controls | 34 lbs., 0 oz. |

One chicken in the 0.1% group developed a pendulous crop the third week of the test and died in the fourth week of the test. Two birds in the 0.2% treated group developed pendulous crops during the third week, one died in the fourth week and one completely recovered by the end of the experiment. No other symptoms developed during the test period and all birds remaining at the end of the test were normal.

EXAMPLE 5

Four groups of mice, ten mice to each group, were housed in a plastic solid bottom pan. The pans were 15 inches wide by 20 inches long and 5 inches deep. A commercial litter was used in each pan. The litter was treated with paraformaldehyde flakes coated with methylene blue and turpentine in the amounts of 0.1% and 2% by weight per pound of paraformaldehyde, respectively. The amounts of paraformaldehyde added to the litter was 0.5%, 1% and 3% by weight per pound of litter. Each pan where the four groups of mice were housed had exactly 680 grams of litter. The litter in the fourth group was not treated at all. After nine days the mice in all groups remained normal with no illness or deaths occurring. The odor in the treated groups was noticeably less than in the control groups. Although the mice lived in direct contact with the treated litter for the entire duration of the experiment, no acute toxic effects were noted in any of the groups.

EXAMPLE 6

Paraformaldehyde flakes were treated with 0.1% by weight of methylene blue and 2% by weight of turpentine per pound of paraformaldehyde. Two pounds of the treated paraformaldehyde was then placed in the center of a floor in a straight line on top of the litter housing 30 birds. The birds were observed for seven days and daily checks were made of the paraformaldehyde to see if it was disturbed. When the material was first put in the room, the birds were curious and some of them pecked at it. However, the majority of birds after pecking at it were repelled by the material. The birds were continuously scratching in the litter and by the 24th hour the material was well dispersed among the litter. There was no evidence of toxicity in the birds at the end of the experiment.

EXAMPLE 7

Example 6 is repeated except gentian violet is substituted for the methylene blue and pine oil is substituted for the turpentine.

EXAMPLE 8

Example 6 is repeated except methyl orange and bromthymol blue was substituted for the methylene blue.

EXAMPLE 9

Six one-gallon bottles with perforated and cotton plugged metal covers were used to hold 100 grams of chicken feces each. Paraformaldehyde was then added to each of the bottles in the following amounts:

| Bottle number | Feces, amount, grams | Paraformaldehyde, amount, grams |
| --- | --- | --- |
| One | 100 | 0.5 |
| Two | 100 | 1.0 |
| Three | 100 | 3.0 |
| Four | 100 | 5.0 |
| Five | 100 | 7.0 |
| Six | 100 | 0 |

Within 24 hours noticeable ammonia gas odor was noted in the untreated control bottle and the pH of the atmosphere reached a maximum of 11 within 48 hours. Bottles two and three reached a maximum pH of 11 in nine days. However, the onset of the ammonia smell did not occur until two days later than bottle one. Bottles three, four and five remained at a neutral or alkaline pH or for a period of 28 days.

EXAMPLE 10

Feces from bottles two, three, five and six of Example 9 were collected on the 12th day. It was noted that the untreated control bottle contained 2.2 billion bacteria per gram of feces. The feces from bottle two contained 164 million bacteria per gram of feces, the feces from bottle three contained 1000 bacteria per gram of feces and the feces from bottle five had a negative count and was considered to be sterile.

EXAMPLE 11

Samples of feces were collected on the 21st day from bottles two, three, five and six from Example 9. A total nitrogen determination using the Kjeldahl method was made on each feces sample. The untreated control feces contained 1.39% total nitrogen, the feces of bottle two contained 1.45% total nitrogen, the feces of bottle three contained 1.75% total nitrogen and the feces of bottle five contained 2.32% total nitrogen.

EXAMPLE 12

Two 1-pound samples of freshly produced manure were used. One sample served as a control, the other was treated by adding 1% paraformaldehyde flakes. The samples were treated in the absence of animal and fowl and in the absence of litter. After one hour, both samples were dried in a shelf dryer at 60° to about 80° C. The nitrogen content of each sample was then measured as shown below:

|  | Weight of dry product, grms. | N content of dried product, percent |
| --- | --- | --- |
| Control sample | 256.5 | 3.65 |
| Treated sample | 273.0 | 4.55 |

EXAMPLE 13

This example demonstrates the usefulness of treating feces with formaldehyde to yield a fertilizer which will not "burn" crops but which will be a good fertilizer and will yield controlled amounts of nitrogen over an extended period of time. The following samples were prepared by admixing paraformaldehyde with chicken feces in the amounts specified.

|  | Feces, grams | Paraformaldehyde, grams |
| --- | --- | --- |
| Sample: |  |  |
| 1 | 100 | 0.00 |
| 2 | 100 | 0.01 |
| 3 | 100 | 0.05 |
| 4 | 100 | 0.50 |
| 5 | 100 | 1.00 |
| 6 | 100 | 3.00 |
| 7 | 100 | 5.00 |
| 8 | 100 | 7.00 |

The feces were then tested for release of nitrogen as ammonia.

The pH of all of the test samples were at all times neutral or alkaline.

Test sample 1, which was the control, had released most of its nitrogen as ammonia in a short time and was thereafter less useful as a fertilizer.

In contrast to this, the treated samples liberated ammonia slowly and over an extended period of time. It was totally unexpected that any ammonia would be liberated since it was thought that the paraformaldehyde would combine with the ammonia to form methenamine and methenamine would be thought not to hydrolyze to ammonia under the alkaline conditions of the test samples. This was not the case, however, and the treated feces released ammonia slowly over an extended period of time. The treated feces are thus excellent for use as a fertilizer.

It will be understood that the claims are intended to cover all changes and modifications of the preferred embodiments of the invention herein chosen for the purpose of illustration, which do not constitute departures from the spirit and scope of the invention.

What is claimed is:

1. The method of treating veterinary animal and fowl feces for elimination of ammonia and other odors and suppression of bacteria content comprising the step of combining with said feces from about 0.01% to about 7% by weight of feces of formaldehyde, said formaldehyde being in a material selected from the group consisting of paraformaldehyde and solid formaldehyde-yielding compounds which decompose into formaldehyde in the presence of said feces, the paraformaldehyde or formaldehyde-yielding compound giving off gaseous formaldehyde over a period of time at ambient temperatures and reacting with ammonia gases released by the said feces, the reaction taking place substantially as the ammonia gases are released and at ambient temperatures, and wherein a slow-releasing nitrogen fertilizer is formed.

2. The method of claim 1 wherein paraformaldehyde is applied at from about 0.05% to about 3% by weight of feces.

3. The method of claim 1 wherein there is litter present with the feces.

4. The method as defined in claim 3 in which the litter comprises a material selected from the group consisting of straw, hay, peanut shells, oat hulls, wood shaving, sawdust, rice hulls, bagasse and combinations thereof.

5. The method of treating wild or domesticated animal or fowl litter and feces comprising the step of applying to said litter and feces in the presence of animals or fowl about 0.1% to about 7% of formaldehyde by weight of feces said formaldehyde being in a material selected from the group consisting of paraformaldehyde and solid formaldehyde-yielding compounds which decompose into formaldehyde in the presence of said feces, said paraformaldehyde or formaldehyde-yielding compound being in admixture with .02% to 2% based on the weight of the paraformaldehyde or formaldehyde-yielding compound of at least one member from the group consisting of crystal violet, gentian violet, methylene blue and a combination of methylene orange and bromthymol blue.

6. The method of treating veterinary animal and fowl feces in the presence of the animals and fowl for elimination of odors and suppression of bacteria content comprising the step of combining with said feces from about 0.01% to about 7% by weight of feces of formaldehyde, said formaldehyde being in a material selected from the group consisting of paraformaldehyde and solid formaldehyde-yielding compounds which decompose into formaldehyde in the presence of said feces, the paraformaldehyde or formaldehyde-yielding compound giving off gaseous formaldehyde over a period of time at ambient temperatures and reacting with ammonia gases released by the said feces, the reaction taking place substantially as the ammonia gases are released and at ambient temperatures, and wherein a slow-releasing nitrogen fertilizer is formed.

7. The method of claim 6 wherein paraformaldehyde is applied at from about 0.05% to about 3% by weight of feces.

References Cited

UNITED STATES PATENTS

| 2,998,390 | 8/1961 | Hamilton | 424—334 |
| 2,993,832 | 7/1961 | Kaintz | 424—334 |
| 3,305,346 | 2/1967 | Dowbenko | 71—1 X |

FOREIGN PATENTS

| 897,067 | 5/1962 | Great Britain | 71—28 |

SAMIH N. ZAHARNA, Primary Examiner

R. BARNES, Assistant Examiner

U.S. Cl. X.R.

424—334

UNITED STATES PATENT OFFICE
CERTIFICATE OF CORRECTION

Patent No. 3,743,496     Dated July 3, 1973

Inventor(s) William Seltzer

It is certified that error appears in the above-identified patent and that said Letters Patent are hereby corrected as shown below:

Col. 1, Line 55: "sprays" has been omitted after "liquid"

Col. 2, Line 41: "slightly" has been omitted after "only" and before "solu-"

Signed and sealed this 29th day of January 1974.

(SEAL)
Attest:

EDWARD M. FLETCHER, JR.
Attesting Officer

RENE D. TEGTMEYER
Acting Commissioner of Patents